US007668164B2

(12) United States Patent  
Jonsson

(10) Patent No.: US 7,668,164 B2  
(45) Date of Patent: Feb. 23, 2010

(54) METHODS AND ARRANGEMENTS IN A TELECOMMUNICATIONS SYSTEM

(75) Inventor: Björn Jonsson, Saltsjöbaden (SE)

(73) Assignee: Telefonaktiebolaget L M Ericsson (Publ)

( * ) Notice: Subject to any disclaimer, the term of this patent is extended or adjusted under 35 U.S.C. 154(b) by 907 days.

(21) Appl. No.: 10/311,088

(22) PCT Filed: May 17, 2001

(86) PCT No.: PCT/EP01/05648

§ 371 (c)(1),
(2), (4) Date: Apr. 3, 2003

(87) PCT Pub. No.: WO01/97462

PCT Pub. Date: Dec. 20, 2001

(65) Prior Publication Data

US 2003/0162499 A1    Aug. 28, 2003

(30) Foreign Application Priority Data

Jun. 15, 2000    (EP)    ................... 00112674

(51) Int. Cl.
*H04L 12/56* (2006.01)
(52) U.S. Cl. .................... 370/392; 370/396; 709/243
(58) Field of Classification Search ............ 370/351, 370/352, 401, 389, 392, 395.1, 396, 397, 370/400, 238; 709/238–244, 225; 455/448
See application file for complete search history.

(56) References Cited

U.S. PATENT DOCUMENTS 5,251,249 A * 10/1993 Allen et al. ................. 455/448

5,729,685 A    3/1998 Chatwani et al. ....... 395/200.11
5,922,049 A *  7/1999 Radia et al. ................. 709/220

(Continued)

FOREIGN PATENT DOCUMENTS

EP         0 915 594         5/1999

(Continued)

OTHER PUBLICATIONS

Jerome H. Saltzer, David P. Reed, and David D. Clark; "Source Routing for Campus-Wide Internet Transport"; XP 000619286; Massachusetts Institute of Technology; Local Networks for Computer Communication; North-Holland Publishing Company; © IFIP, 1981; 21 pages.

(Continued)

*Primary Examiner*—Kwang B Yao
*Assistant Examiner*—Jeffrey M Rutkowski

(57) ABSTRACT

The invention comprises an overlay network that can be under full control of a service provider. Routing of packets between nodes in said overlay network is performed by means of an underlying large communication network. The nodes in the overlay network comprises specific nodes in the large communication network. Therefore, routing of packets according to the invention is transparent for nodes not belonging to the overlay network. One or more federative nodes manages the routing information. The federative nodes are connected to the network and comprise a computer and software, designed for providing said management of the routing information. The management of routes in the overlay network may of course be distributed over several hosts, for scalability of large overlay networks and reliability reasons. A purpose of the invention is to enable a user organization to control the routing of packets for their overlay network via different external networks.

11 Claims, 7 Drawing Sheets

U.S. PATENT DOCUMENTS

| | | | |
|---|---|---|---|
| 6,058,431 A * | 5/2000 | Srisuresh et al. | 709/245 |
| 6,141,325 A * | 10/2000 | Gerstel | 370/238 |
| 6,178,171 B1 * | 1/2001 | Alexander et al. | 370/395.54 |
| 6,272,127 B1 * | 8/2001 | Golden et al. | 370/352 |
| 6,415,323 B1 * | 7/2002 | McCanne et al. | 709/225 |
| 6,473,405 B2 * | 10/2002 | Ricciulli | 370/238 |
| 6,597,684 B1 * | 7/2003 | Gulati et al. | 370/351 |
| 6,604,146 B1 * | 8/2003 | Rempe et al. | 709/238 |
| 6,785,273 B1 * | 8/2004 | Verma | 370/389 |
| 7,069,344 B2 * | 6/2006 | Carolan et al. | 709/250 |
| 2004/0010616 A1 * | 1/2004 | McCanne | 709/238 |

FOREIGN PATENT DOCUMENTS

| | | |
|---|---|---|
| WO | WO 98/58474 | 12/1998 |
| WO | WO 01/97461 | 12/2001 |
| WO | WO 01/97462 | 12/2001 |

OTHER PUBLICATIONS

David R. Cheriton; "*Sirpent™ : A High-Performance Internetworking Approach*"; XP 000133120; Stanford Univesity; Computer Communication Review; Sep. 19, 1989; No. 4., New York, US; pp. 158-169.

Cheriton, Mgritter; "*TRIAD: A New Next-Generation Internet Architecture*"; Computer Science Department, Stanford University; No Date; pp. 1-15.

IBM Technical Disclosure Bulletin; "*Bundling Short Packets In An ATM or Packet Network*"; XP 000189604; IBM Corp.; 1991; pp. 360-362.

ISR: PCT/EP 01/05647; Date Mailed Oct. 16, 2001.

Information Sciences Institute, "Internet Protocol Darpa Internet Program Protocol Specification", Sep. 1981, pp. 1-49.

"Source Routing for Campus-wide Internet Transport," by Jerome H. Saltzer, et al., Massachusetts Institute of Technology; Local Networks for Computer Communications Journal, North Holland Publishing Co., 1981.

* cited by examiner

METHODS AND ARRANGEMENTS IN A TELECOMMUNICATIONS SYSTEM

FIELD OF INVENTION

The present invention relates to communication in a communication network, including several interconnected networks. More closely, the present invention relates to a method and an overlay network on top of the communication network and a computer program designed for providing management of the routing information. In particular, the invention deals with routing through such overlay networks.

DESCRIPTION OF RELATED ART

An internet is any set of networks interconnected with routers. The Internet is the biggest example of an internet. An internet may by functioning over wireline links, or over air interfaces, e.g. by means of short range radio waves such as Bluetooth or a mobile network.

The Internet is the worldwide interconnected WAN, based on the TCP/IP protocol suite. The complex problem of routing on large networks can be simplified by structuring a network into a heirarchy of smaller networks, where each level is responsible for its own routing. Basically, the Internet has three levels: the backbones, the mid-levels, and the stub networks. The backbones know how to route between the mid-levels, the mid-levels know how to route between the stub-network, and each stub network (being an autonomous system) knows how to route internally.

Each interconnected network includes one or more interconnected nodes. Communication between two nodes of the Internet is achieved by transmitting digital data, organized into packets, between the two nodes. The network layer of the Internet protocols is very powerful in handling user packets traveling between any source node and any destination node over the Internet using intermediary internets having different technologies and separate administration. This is achieved by giving the full control of how the packets are routed to the networks that are involved and by making the addresses associated with each packet easily accessible. This implies that the user can not easily influence the routing of their packets and that said packets are open to the analysis and manipulation by interceptors. In the present description, the term "user" refers to a computer sending and receiving packets.

The Internet Protocol (IP) formally specifies the format of Internet packets, called datagrams, and informally embodies the ideas of connectionless delivery. Connectionless delivery means that in a sequence of packets between two parties each packet is routed and forwarded independently. Connection based delivery means that there is first a connection establishment phase when a forwarding path is set up. Packets are then forwarded along this path until communication is terminated. The connection is then released. Analogous to a physical frame, the IP datagram is divided into header and data areas. Among other information, the datagram header contains the source and destination IP addresses, fragmentation control, precedence, and a checksum used to catch transmission errors. Besides fixed-length fields, each datagram header can contain at least one option field. The option field is of variable length, depending on the number and type of options used as well as the size of the data area allocated for each option. In an exemplary internet protocol called IP, each node in the internet is assigned an internet address which is unique over the entire internet. A node receiving a packet can identify the source and destination nodes by examining the IP addresses stored in the header.

For further information concerning Internet, see Information Sciences Institute, RFC 791 "Internet Protocol", September 1981.

The IP addresses assigned in a hierarchical fashion; the internet address of each node contains an address portion indicating the sub-network of the node, and a host portion, valid inside the sub-network, that identifies a particular host or router and discriminates between the individual nodes within a particular sub-network.

The idea of layering is fundamental in protocol design because it provides a conceptual framework for protocol design. In a layered model, each layer handles one part of the communication problem and usually corresponds to one protocol. Protocols follow the layering principle, which states that the software implementing layer "n" on the destination machine receives exactly what the software implementing layer "n" on the source machine sends. In practice, protocol software uses multiplexing and demultiplexing to distinguish among multiple protocols within a given layer, making protocol software more complex than the layering model suggests.

Internet Protocol (IP) provides one of the two major protocols used in internetworking. A user considers the Internet as a single virtual network that interconnects all hosts, and through which communication is possible; its underlying architecture is both hidden and irrelevant. Conceptually, an IP internet provides three set of services in three dependent layers. The three layers will be disclosed in more details below.

In FIG. 2 is depicted the three layers of a IP stack internet according to prior art; their arrangement in FIG. 2 suggests dependencies among them. At the lowest level 1, a connectionless delivery service provides a foundation on which everything rests. At the next level 2, a transport service provides a higher platform on which application services depend. I.e., internet software is designed around three conceptual networking services arranged in a hierarchy.

A disadvantage of the conventional Internet is that only one specific style of routing, e.g., hierarchical routing is easily supported by the current packet structure and packet transfer protocol. Routing is defined by protocols between routers. The resulting routing is neither controllable nor predictable by the sender. Thus, the conventional Internet does not readily permit a source node to specify the entire route or the manner via which a packet is routed. Nor is it simple for a user to redirect a packet via an alternate sequence of nodes, e.g., in order to obtain the required quality of service in the Internet. I.e. policy routing is performed by networks, not by users. Second, the source and destination node identification, routing and packet handling reactions are performed arbitrarily in the conventional Internet. For example, if a specific quality of service distinguished by low delay is requested in the packet, it is difficult to predict whether a node will handle the packet with a low delay or route the packet along a low delay route in order to achieve a low delay.

Basically, the Internet is a carrier of traffic from one point to another and the path followed between these two points is very much a decision by the networks that are involved and out of control for the user. However, there are situations when it is desirable to have better control of the routing. It is e.g. common that companies build Intranets comprising several independent sub-networks linked via external networks to form a company network. In order to fulfill company standards regarding, e.g. quality of service, preferred network operators should be used with which a company may have special agreements. It should also be simple to quickly switch between different operators or to adjust how traffic is divided between operators.

A known method to control the routing in an Internet is referred to as Source Routing for Campus-Wide Internet Transport XP000619286. Dynamic Source Routing (DSR) is a routing protocol designed e.g. for use in mobile ad hoc networks. The protocol allows nodes to dynamically discover a source route across multiple network hops to any destination in the ad hoc network. When using source routing, each packet to be routed carries in its header the complete, ordered list of nodes through which the packet must pass. A deficiency of DSR is that it requires knowledge of the network topology. This information is generally neither available to the ordinary user, nor to any ordinary host in the network. Furthermore, the network topology may change at any moment invalidating previously discovered routes. Another deficiency of DSR is that the complete, ordered list, including many addresses, entails an extensive overhead. Furthermore, the content of the routing tables is not defined.

Another known way for the source to influence the routing of packets is to apply the methods of IP in IP encapsulation. Said method means that an original IP-packet is wrapped into a packet destined to an intermediary node. The intermediary node removes the wrapping and forwards the packet to the original destination. Said method may be applied recursively. The encapsulated IP address is located in the payload, and the payload is like any other message sent from one machine to another.

The U.S. Pat. No. 5,353,283 describes a method for transmitting a packet via a sequence of nodes in a network. The transmitted-packet contains a sequence of one or more identifiers in a sequence of fields and a pointer pointing to a particular identifier in the sequence of identifiers in a field of a routing section of a header in the packet. A node of the sequence of nodes at which the packet is placed selects a forwarding table from a set of forwarding tables maintained in a memory at that node. The node then retrieves an entry from the selected forwarding table indexed by the identifier in the sequence of identifiers pointed to by the pointer. The node then transmits the packet to the next node of the sequence of nodes indicated by the retrieved forwarding table entry. The method according to U.S. Pat. No. 5,353,283 is useful for private virtual networks, virtual global ISP and is transparent to intermediary networks.

The deficiency with the method according to U.S. Pat. No. 5,353,283 is that it requires a new type of header and does not function in the currently available Internet, i.e. the method according to U.S. Pat. No. 5,353,283 requires a new standard. Said method functions only over networks having implemented said new standard. Furthermore, the overhead is large.

One of the problems that derive from the attachment of existing IP Networks to the Internet is that local hosts must have globally unique addresses in order to be identified by the backbone routers of the Internet. The Internet routers are not able to route packets correctly if the IP addresses are not unique. End-users connected to hosts not having proper addresses cannot be reached, and cannot establish application sessions.

Network Address Translation (NAT) solves the problem by reassigning IP addresses. It uses a pool of available globally unique addresses that are constantly reused. Internal Network addresses are allocated according to internal considerations of the Network. There are sets of addresses assigned for local use. Said addresses are not valid outside local networks and may therefore be reused a number of times for internal addressing in different local networks. Global addresses must remain unique in order to distinguish between different hosts. When a packet is routed, the NAT replaces the locally valid address with a temporary global address. As soon as the application session is over, the global address may be returned to the pool to be reassigned. It should be noted that NAT only involves a translator at the sending side and no communication is needed with other network nodes, e.g. an address translator at the receiving side.

NAT enhances the level of security within the Network by hiding its internal structure. NAT also permits a number of users sharing a smaller number of global addresses because global addresses are required only when a user communicates outside the local subnet. If the external connectivity of a subnet is changed from one external network to another, there is no need to replace the IP address of each and every host on the internal net—the task is accomplished by the NAT.

SUMMARY OF THE INVENTION

The main problem with routing in an internet according to prior art is that a source node has great difficulties in specifying the manner a packet is routed.

Another problem with routing according to prior art is that it is the intermediary nodes, which take the routing decisions, and a user organization has difficulties controlling the path of a data packet.

A further problem with existing methods and arrangements for source routing, i.e. when the sending host specify the exact path the datagram must follow to reach its destination, is that the sender has to get the exact knowledge about the network nodes needed to decide how packets should be routed.

The above problems are solved by providing an overlay network that can be under full control of a service provider. Routing of packets between nodes in said overlay network is performed by means of an underlying communication network. The nodes in the overlay network comprise specific nodes in the communication network. Therefore, routing of packets according to the invention is transparent for nodes not belonging to the overlay network.

In the method and arrangement according to the invention, one or more federative nodes manage the routing information. The federative nodes are connected to the network and each comprise a computer and software, designed for providing said management of the routing information. The management of routes in the overlay network may of course be distributed over several hosts, for scalability of large overlay networks and for reliability reasons.

In more details, the overlay network according to the invention comprises at least one Virtual Route Administrator (VRA) located in a node in said overlay network. The VRA administrates the setting up of routes from any source to any destination via overlay nodes in an appropriate way. The nodes in the overlay network are arranged so that at least three nodes, a sending node, a VRA, and a Virtual Route Server (VRS) exchange certain signaling information prior the transmission of a packet over a specified path. Said signaling requires no changes of the current existing communication protocols in the intermediary networks. At the sending side, format and contents of packets are transformed in order to enable packets being routed along the path chosen by the VRA. The VRS is located at the receiving side and retransforms the packets to their original format. It is apparent for a man skilled in the art that a Virtual Route Server (VRS) may be provided in an ordinary router.

The inventive methods may be provided by one or several computer software products. The computer software product is directly loadable into the internal memory of an independent access unit in the communication network, according to the invention. The independent access unit may be connected to the nodes in the overlay network.

The inventive routing method borrows certain aspects from Internet standards such as Network Address Translation (NAT), Dynamic Source Routing, IP in IP encapsulation etc.

The main purpose of the invention is to enable a user organization to control the routing of packets for their overlay network via different external networks.

One purpose of the invention is that it enables a user organization to supervise the performance when different routes are chosen.

A further purpose of the invention is to enable all organization to direct the traffic through preselected routers in order to provide a better quality of service and hiding the structure of internal networks for external parties on shared external networks.

A yet further purpose of the invention is thus, to provide an overlay network that can be under full control of a service provider.

An advantage of the invention is that senders may be supported by a third party, a VRA, which can build and apply the necessary knowledge. In contrast to individual users, the VRA can build and maintain an overall view of the overlay network.

Another advantage of the invention is that a user organization is able to supervise the performance when different routes are chosen.

A further advantage of the invention is that it enables an operator of an overlay network to quickly switch between different providers of external network or to adjust how traffic is divided among such networks.

A yet further advantage of the invention is that the service providers may offer new kinds of services for their clients. The invention enables new kinds of business agreements in the field of communication.

Another advantage with the usage of virtual addresses according to the invention is that the datagram is transferred with better security.

The term "comprises/comprising" when used in this specification is taken to specify the presence of stated features, integers, steps or components but does not preclude the presence or addition of one or more other features, integers, steps, components or groups thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

RELATED ART

WO 98/58474 relates to a method of establishing a quality assured connection between two end nodes. A user in an end node sends a connection request to a Quality of Service and Charging (QSC) server and specifies (or uses default) quality parameters, such as minimum bandwidth, maximum cost per minute, maximum delay, maximum error rate. The connection request also comprises the addresses of the calling end node, the destination end node. The QSC server has a link status data base and a route map data base. Based on information contained in the connection request the QSC server consults the route map data base to ascertain possible routes and possible links between the end nodes. Links that fulfil the desired quality parameters are labelled "qualified". If an acceptable connection cannot be find the QSC server sends solicitations for bids to potentially participating intermediate nodes. Finally the QSC server sends an advisory message to the calling node; this message suggesting allowable or almost allowable routes to the calling node. The calling customer may now either terminate the session or edit the desired quality parameters. If the calling customer agrees to one of the suggested routes the QSC server stores information on the links along this route in a session data base. The QSC server informs the intermediate nodes which are to be included in the connection and identifies the links which are to used for the connection. A transmission authorization message is finally transmitted from the QSC server to the calling end node which starts sending its data to the called end node.

In the paper Salzer J H et al "Source routing for campus-wide internet transport", Local Networks for computer communications, Proceedings of the IFIP working group, International workshop on local networks, XX, XX, 1981, XP000619286 a source routing mechanism is disclosed that has several advantages over hop-by-hop routing schemes. The source routing scheme comes into play at a relatively low layer of protocol, sometimes called the internet layer, which in the ISO reference model appears somewhere in the transport layer. Source routing means that the exact route is inserted in a header field of a packet and that the packet then follows this route when transmitted.

In hop-by-hop routing schemes every node has as its target identifier a permanent, unstructured unique identifier. Each gateway has a set of tables that allow it to determine the appropriate next step in the route to every possible node. The unique identifier provides no routing information whatsoever. An alternative hop-by-hop routing scheme uses a two-part hierarchical identifier which comprises an identifier of the sub-network to which the node is attached and a node number (usually the local transport address). Each gateway has a set of tables that allow it to determine the appropriate next step in the route to every possible named sub-network. Since there are many fewer sub-networks than nodes, these tables are much smaller than in the case of the unstructured unique identifier. Table size is thus reduced.

With the proposed source routing scheme the internet transport layer contains in the place of the target identifier a variable-length string of local transport addresses, with the property that each gateway merely takes the next local transport address from the string, moves that address to the local transport protocol address field, and sends the packet on its way. With this approach, a gateway needs no knowledge of network topology, so the tables used for hop-by-hop routing vanish.

For source routing to work, the source of a message must somehow know what route to place in the header of a packet. To avoid that every source of packets must have knowledge of all possible routes Salzer et al proposes that route selection be accomplished by consulting a central routing service somewhere in the network. The routing service is a specialised node whose function is to maintain an internal representation of the topology of the network interconnection along with useful class-of-service information about various sub-networks and gateways. The desired target must of course have some identifier, perhaps the unstructured unique identifier or the hierarchical identifier mentioned above.

Neither WO 98/58474 nor the paper by Salzer et al has a central routing service node that owns global addresses among which it selects one which it assigns to a connection request it receives from an originating host that wants to set up a connection to a desired target host. Nor does the central node communicate said global addresses to the originating host and to the target host thereby allowing packets to be transported in networks with nodes are not controlled by the central routing service node.

In WO 98/58474 as well as in the Salzer paper the central routing service node must know the topology of the sub-networks in order to be able to advise on a route. This means that the central routing service node must be able to control all nodes in all sub-networks.

The problem to be solved by the present invention is to provide a method and device that allows routing of packets along a route that goes through networks that are administered by a central routing service node as well as through networks, below referred to as external networks, that that are not administered by a central routing service using globally unique addresses which are valid in the external networks. This problem is solved with the communication method and the a route administrating node in accordance with the appended claims. As destination address for the packet is used an address that belongs to a node in the destination network, which is administered by the central routing service node, and as sending address for the packets is used a globally unique address which is administered by the central routing service node, and which is used to route the packets to a receiving host in the destination node. The use of a sending address, i.e. a source address, as means for routing of a packet in the destination network is believed to be novel.

The invention will now be described in more detail with reference to preferred exemplifying embodiments thereof and also with reference to the accompanying drawings.

DETAILED DESCRIPTION

Figure 1:
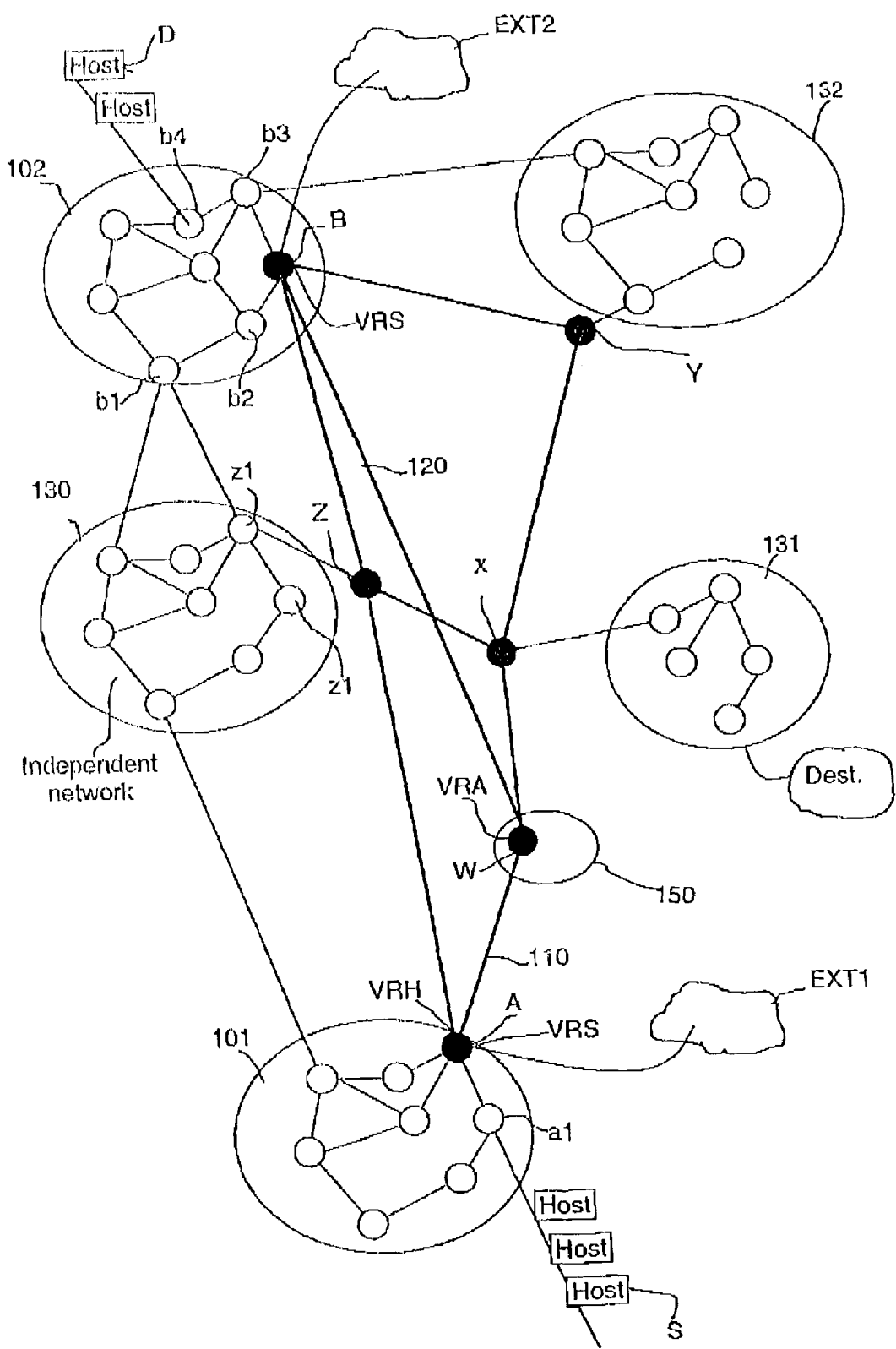
FIG. 1 is a diagram illustrating the overlay network according to the invention on top of a large communication network.
Figure 2:
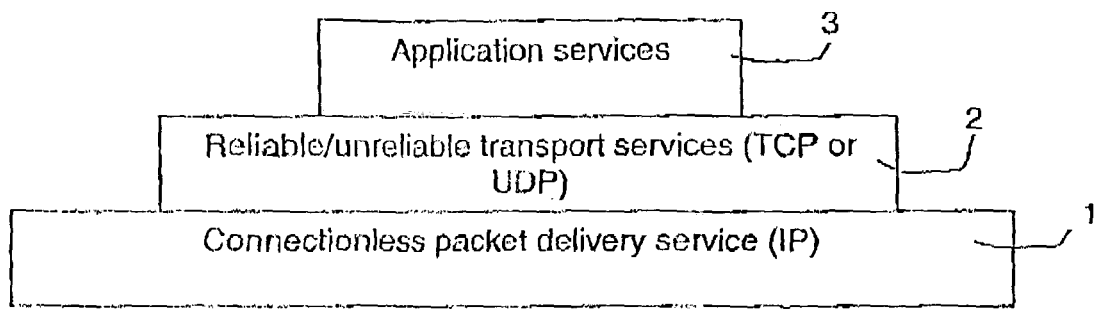
FIG. 2 is a diagram illustrating the three layers in the Internet.

FIG. 1 illustrates an overlay network according to the invention on top of a large communication network. The large communication network comprises every node in FIG. 1. The exemplary overlay network comprises six nodes being part of the large communication network, that is to say the nodes A, B, W, X, Y and Z. The node A is located in an independent network 101, the node B is located in an independent network 102, the node X is connected to an independent network 131, the node Y is connected to an independent network 132, and the node Z is connected to an independent network 130. In this embodiment, a Virtual Route Administrator VRA is located in the node W and an independent network 150. In this embodiment, the VRA is the only host in the independent network 150. However, a VRA may be located in any of the other independent networks. Furthermore, the VRA functionality may be distributed over several independent networks. The VRA administrates the routing path from a source host S to a receiving host D in a predetermined way across the large communication network, which can be the Internet, e.g. by applying differentiated bearer services over the public Internet. It is thus implicitly understood that VRA has knowledge about the topology of the overlay network in order to determine suitable routes. However, the VRA does not have to know the topology of the complete underlying network. An organization managing a network of overlay nodes may, e.g. have a number of border nodes (routers) connected to a plurality of intermediary independent networks in the Internet acting as intermediaries between sending and receiving hosts, the sending host being e.g. the host S in the independent network 101 and the receiving host being the host D in the independent network 102. For example, the source network and the destination network may constitute parts of a corporate network. In a further embodiment, the source and destination networks may constitute separate distributed access networks of an Internet Service Provider (ISP). Every sending host is provided with, or has by a proxy access to, a software program module, herein called a Virtual Route Handler (VRH). The VRH handles the path, i. e. the sequence of routers to be passed in the overlay network.

Figure 5:
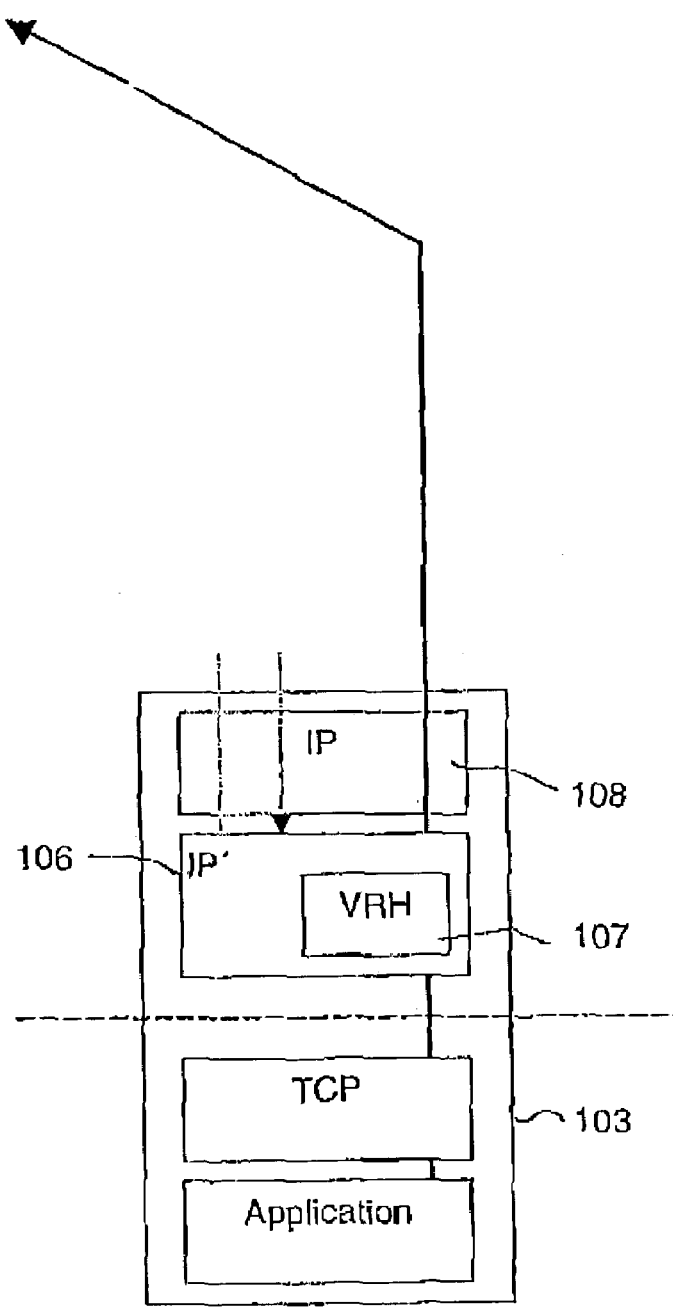
FIG. 5 is a diagram of the VRH and its functionality.

The visual route handler VRH and its functionality is disclosed in FIG. 5. The standard IP protocol stack is shown at reference sign 108, whereas at reference sign 106 is shown an extension IP' of the protocol stack. It is apparent for a man skilled in the art that this implementation of the extension IP' is only an example and that other implementations are feasible. The extension IP' can, e.g., also be implemented at a router such as the default router of the originating host. The extended protocol stack 106 utilizes a software program module 107, which is called Virtual Route Handler (VRH). More precisely, the VRH assembles a message addressing the Virtual Route Administration VRA shown in FIG. 1 in order to request a specification of the path to be used given the current source S, the destination D and desired type of service. When the response is available, the VRH uses the path specification given by the VRA to modify the original IP-packet to make it follow the selected path. Several different methods may be used to enforce routing along the selected path.

Now, the process of transmitting information from the source host S to the destination host D will be disclosed in more details with reference to FIG. 1. Each independent network belonging to the overlay network is provided with a Virtual Route Server (VRS) that can be reached via the public Internet via an unique Public Internet Address. The two independent networks 101 and 102 are in this example serving two branches of the same organization. The host computer S in the independent network 101 is in this example sending a message over the Internet to a destination, the receiving host D in the independent network 102. A user, i.e. the host computer S served by the border node A, who is requesting transmission of a message, runs an application program, e.g. a commercially available program. The extension IP' of the standard IP protocol stack is used. The extended protocol stack utilizes the Virtual Route Handler (VRH) software. More precisely, the VRH assembles a message addressing the Virtual Route Administrator (VRA) in the independent network 150. The message is sent along the path 110 and it comprises the address of the sending host S served by the node A, the address of the receiving host D served by the node B and a data field. The data field is further structured into several information units, which is more clearly shown in FIG. 3a.

Figure 3A:
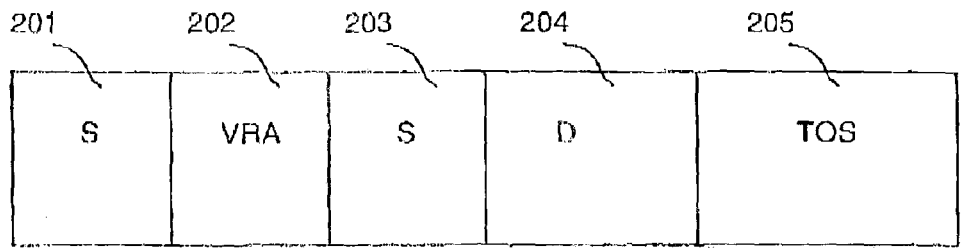
FIG. 3a-e shows exemplary diagram of signal messages.

FIG. 3a shows a simplified IP datagram whereby fields 201 and 202 comprise the source IP address and destination IP address, respectively. More precisely, the destination field 202 comprises the address of a selected VRA. The value of the address of the VRA in the field 202 may be part of the configuration data submitted at the installation of the software program VRH, or may be dynamically allocated. The data fields 203-205 comprise the data part of the datagram, whereby the field 203 once more comprises the source address, the field 204 comprises the end destination, i.e. the address to the receiving host D in the independent network 102, and field 205 comprises Type Of Service TOS, such as "best-effort" or real time.

When the VRA in the independent network 150, see FIG. 1, has received a datagram according to FIG. 3a, it interprets the reception as a request to select a path from the source host S in the independent network 101, to the receiving host D in the independent network 102. The path is selected to fulfill conditions determined by parameters indicating Type Of Service TOS. E.g., TOS may indicate that the source application is a voice over IP source, thereby requiring a connection, which can manage a real time data stream.

In response to said request for a path, the VRA returns a message to the VRH serving the sending host S, said message comprising information about a selected path and a method to enforce routing via this path. The VRA allocates addresses and determines the method for transformation of packets. When the virtual route handler VRH has received the response from the VRA, along the path 110 in FIG. 1, it can use the routing information to compile a datagram comprising source routing information about the various routing nodes in the selected path, as indicated by the at least one address "IP address of first hop", "IP address of second hop", etc, exemplified by FIG. 3c. The source routing option or encapsulation provides ways for the user organization to dictate a path through the Internet. Network operators can use source routing to supervise throughput. Source routing can be used to force IP datagrams to traverse a preselected network, even if routers would normally choose a path that did not include it. The ability to make such tests is especially important in a production environment, because it gives freedom to route a user's datagram over networks that are known to operate correctly while simultaneously testing other networks. Of course, such routing is only useful for people who understands the network topology; the average user has no need to know or use it. The disclosed invention enables the survey and the supervision of alternative paths to be implemented in connection with the VRA.

The IP protocol supports two forms of source routing. The first form, called strict source routing option specifies an exact route by giving a list of IP addresses the datagram must follow, i.e. a sequence of preselected routers. The path between two successive addresses in the list of IP addresses must consist of a single physical network; an error results if a gateway cannot follow a strict source route. The second form, called loose source routing, also includes a sequence of IP addresses. The loose source option specifies that the datagram must follow the sequence of IP addresses, but allows multiple network hops, i.e. the datagram is permitted to pass via other nodes, between the nodes on the list. E.g., when the nodes A, Z and B are specified, the datagram may take the route A, Z, z1, b1, b2 on its way to the final destination.

Figure 3B:
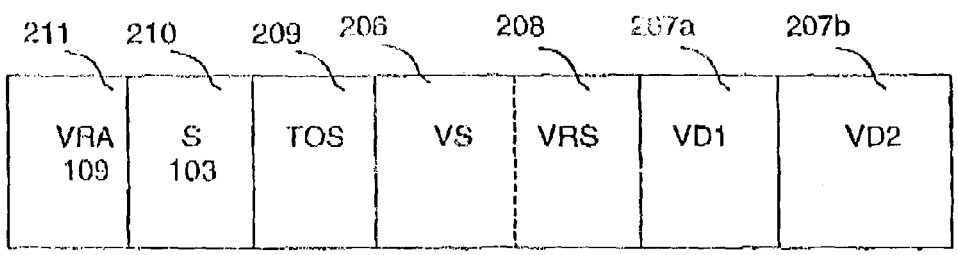
Figure 3C:
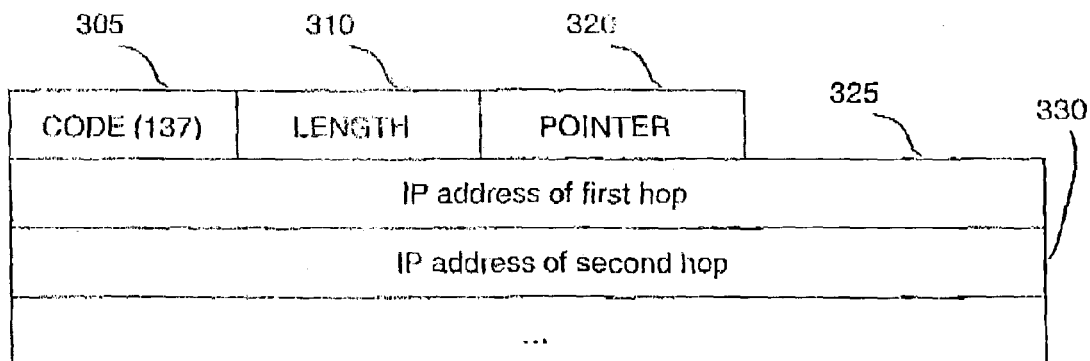

FIG. 3c shows in more detail an exemplary format of the datagram when applying the source routing options. The datagram contains a CODE field, a LENGTH field, a POINTER field and a number of fields specifying the IP addresses of the nodes the datagram must visit on its way to the final destination, herein called "IP address of first hop" 325, "IP address of second hop" 330, etc. The field 305 contains the option class and option number and indicates that the datagram has source routing information. The LENGTH field 310 specifies the total length of the option as it appears in the IP datagram, including the first three octets. The POINTER field 320 specifies the offset within the option of the next available slot.

Both source route options require routers located in the nodes along the path to overwrite items in the address list with their local network addresses. Thus, when the datagram arrives at the destination, it contains a list of all addresses visited.

Each router examines the POINTER and LENGTH fields in the datagram according to FIG. 3c to see if the list has been exhausted. The datagram according to FIG. 3c will be disclosed in more detail below. If the list has been exhausted, the pointer is greater than the length, and the router routes the datagram to its destination as usual. If the list is not exhausted, the gateway follows the pointer, picks up the IP address, replaces it with the router's address, and routes the datagram using the address it obtained from the list.

Two routers that exchange routing information are said to be exterior neighbors if they belong to two different autonomous systems, and interior neighbors if they belong to the same autonomous system. E.g., in FIG. 1, b1 and b2 are interior neighbors, Z and X are exterior neighbors. The protocol, used by exterior neighbors in order to advertise reachability information to other autonomous systems, is called exterior gateway protocol or EGP, and the gateways (routers) using it are called exterior gateways (border nodes). In the connected Internet, EGP is especially important, because autonomous systems use it to advertise reachability information to the core system. EGP has three main features. First, it supports a neighbor acquisition mechanism that allows one router to request another to agree that the two should communicate reachability information. A router aquires an EGP peer or an EGP neighbor. EGP peers are neighbors only in the sense that they exchange routing information; there is no notion of geographic proximity. Second, a router continually tests whether its EGP neighbors are responding. Third, EGP neighbors periodically exchange network reachability information by passing "routing update messages".

Now, a more detailed explanation will be given of the usage of the virtual sending address VS with reference to FIG. 1 and the datagram in FIG. 3b.

The datagram in FIG. 3b comprises a first field 211 comprising the address of the VRA in the node W, a second field 210 comprising the address of the sending host S in the node A, a third field 209 comprising information concerning Type Of Service TOS, a fourth field 206 indicating the Virtual Sending host VS, a fifth field 208 indicating the address of the VRS. A sixth field 207a indicating the first virtual address VD1, and a last field 207b indicating the second virtual address VD2.

The VRA at the node W has at its disposal a plurality of IP addresses from which plurality the VRA can select any address to be inserted as the value VS. VRA acts as a border router towards the Internet and exchanges routing information with other exterior border nodes (routers) by means of a protocol, e.g. the above disclosed Exterior Gateway Protocol or EGP.

Figure 3D:
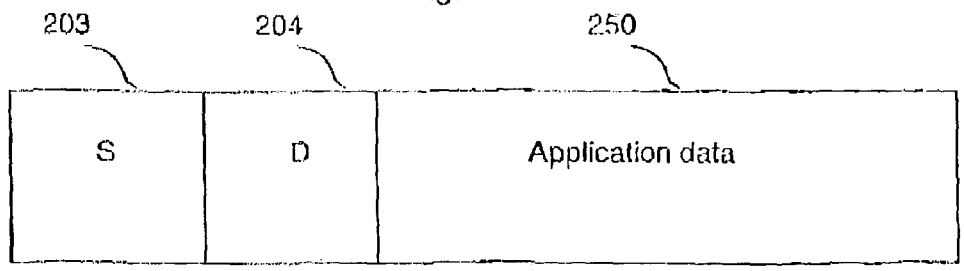
Figure 3E:
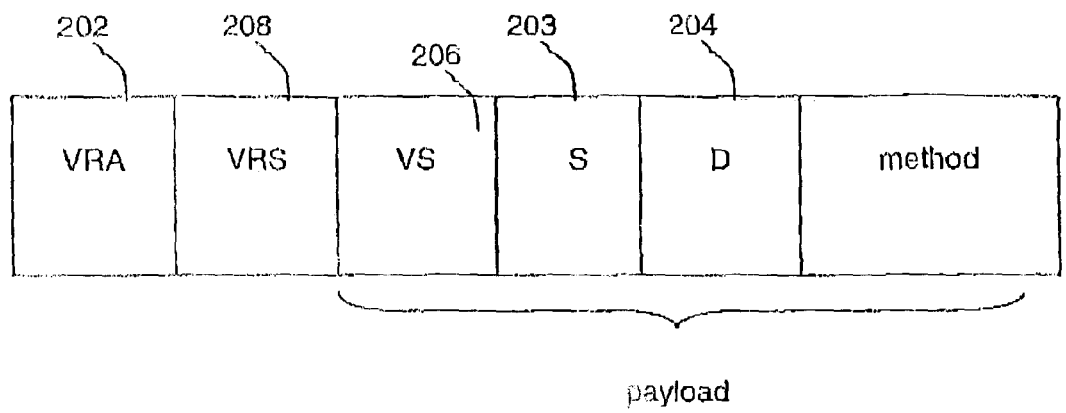

The plurality of IP addresses mentioned above are virtual in the sense that they all belong to the VRA and do not correspond to any individual physical host. The VRA treats these virtual host addresses as references to Internet paths from a sender, e.g. the host S in the independent network 101, to a receiver, the host D in the independent network 102. Thus, each packet transfer along a path from a sending host to a receiving host is assigned a reference in the form of a virtual host address VS. The VRA, when receiving a request for a path along the path 110 in FIG. 1, informs the Virtual Route Server, VRS, at the receiving host in the independent network 102, the virtual address VS assigned to that request. Thus, the VRA sends a message along the path 120 to the VRS at the node B, e.g. in the format shown in FIG. 3e. FIG. 3e shows a datagram, wherein the sender is the VRA, the receiver is the VRS, and the payload contains the address of the VS, the address of the original sending host S, the address of the receiving host D and the method to be used to enforce the selected path. VRS creates a record identified by the address VS, and stores the original sender address of the sending host S and the original receiver address of the receiving host D. Then, the VRS in the node B acknowledges the request along the path 120. In order for the VRA to know which VRS node should receive the VS reference selected for the path, the VRA is provided with tables, wherein network addresses are associated with at least one VRS in the receiving network.

Referring now to the reception at the VRS, according to the present embodiment the VRS located in the node B in FIG. 1, of a datagram comprising an encapsulated datagram, the VRS analyzes the address of the sending host, that is a virtual address VS. By interrogating the record of virtual addresses VS, the VRS recovers the original address of the sending host S and the address of the receiving host D. The VRS then creates a datagram, according to FIG. 3d, comprising the address of the source host S 203, address of the receiving host D 204 and the original application data 250, that is finally routed through the destination network 102 to the end destination, the receiving host D. Thus, according to this embodiment, there is a one-to-one correspondence between the virtual address VS and a path defined by the VRA. Also, when a packet arrives at its final destination it is restored to its original form.

Figure 3F:
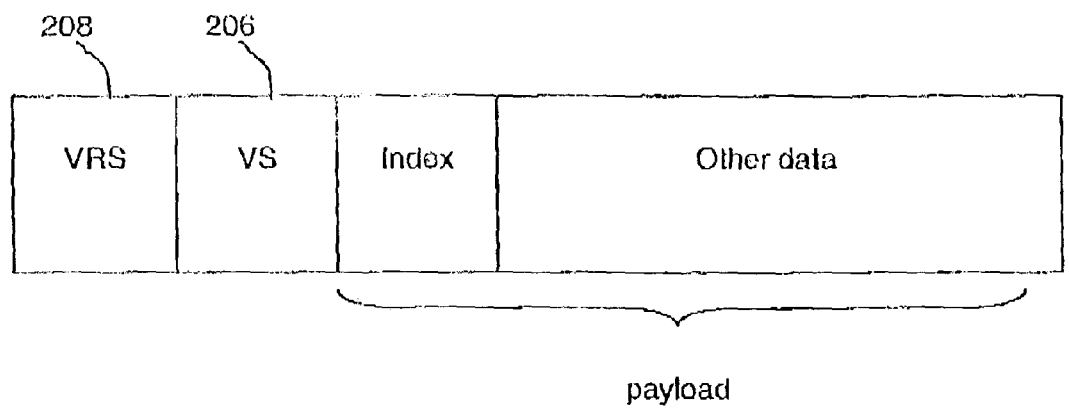

In another embodiment, separation of different paths is instead achieved by introducing an index, represented by a data field added to the payload part of the packet. In FIG. 3f is shown a datagram used by this embodiment. Said datagram comprises the addresses of the virtual address VS and the VRS, respectively, and a payload comprising the original payload augmented by an index field reference. In this way, the node VRA, assigning addresses, therefore uses the same virtual address VS for all paths. The receiving VRS node, instead of analyzing the virtual address VS to retrieve the true addresses, now analyzes the index field. The virtual address, VS, in this case acts as an indicator that the indexing method is used.

From the fact that a virtual address VS that is used, belongs to the Virtual Route Administrator VRA, it readily follows that, in case of a failure in the transmission along the path, a corresponding error message will be returned to the perceived sender, i.e. to said address. As the virtual address VS indicated a virtual host in the network 150 including the VRA, the error message will in fact be received by the VRA. Thus, in one embodiment, the VRA has maintenance functions in order to determine actions on transmission errors and to record faults to produce statistics and quality of service measurements.

Returning again to the assignment of a virtual sender address VS, it is clear, from the above, that the virtual address VS is also a reference to a certain source-destination combination. In order to avoid repeated requests for a virtual address VS, and a corresponding path definition, the Virtual Route Handler, VRH, is allowed to use an allocated virtual address VS for a certain time. Thus, during this time, the virtual address VS allocated for a source-destination combination is cached by the VRH and is thus immediately accessible to be used for a sequence of datagrams between the same source and destination.

In one embodiment, the communication indicated at the path 110 adheres to the principles similar to those of the Dynamic Host Configuration Protocol, DHCP. The VRA, similarly to a DHCP server, uses the set of virtual addresses VS already described. In this embodiment, temporary addresses could be used. Discarded addresses may be reused. An advantage of this method is that the total amount of used addresses can be limited.

A deficiency with the described embodiment of the method disclosed herein with reference to FIG. 1 is that a host, e.g. host S in the network 101, which communicates with the VRA over the global Internet, exposes the address of the sending host S. This is a disadvantage with respect to security as a fraudulent use of said address is possible, e.g. to create a false response. It is therefore of interest to be able to perform this communication in a secure way to protect relevant information. In the following, an embodiment is described which achieves this goal.

Figure 6:
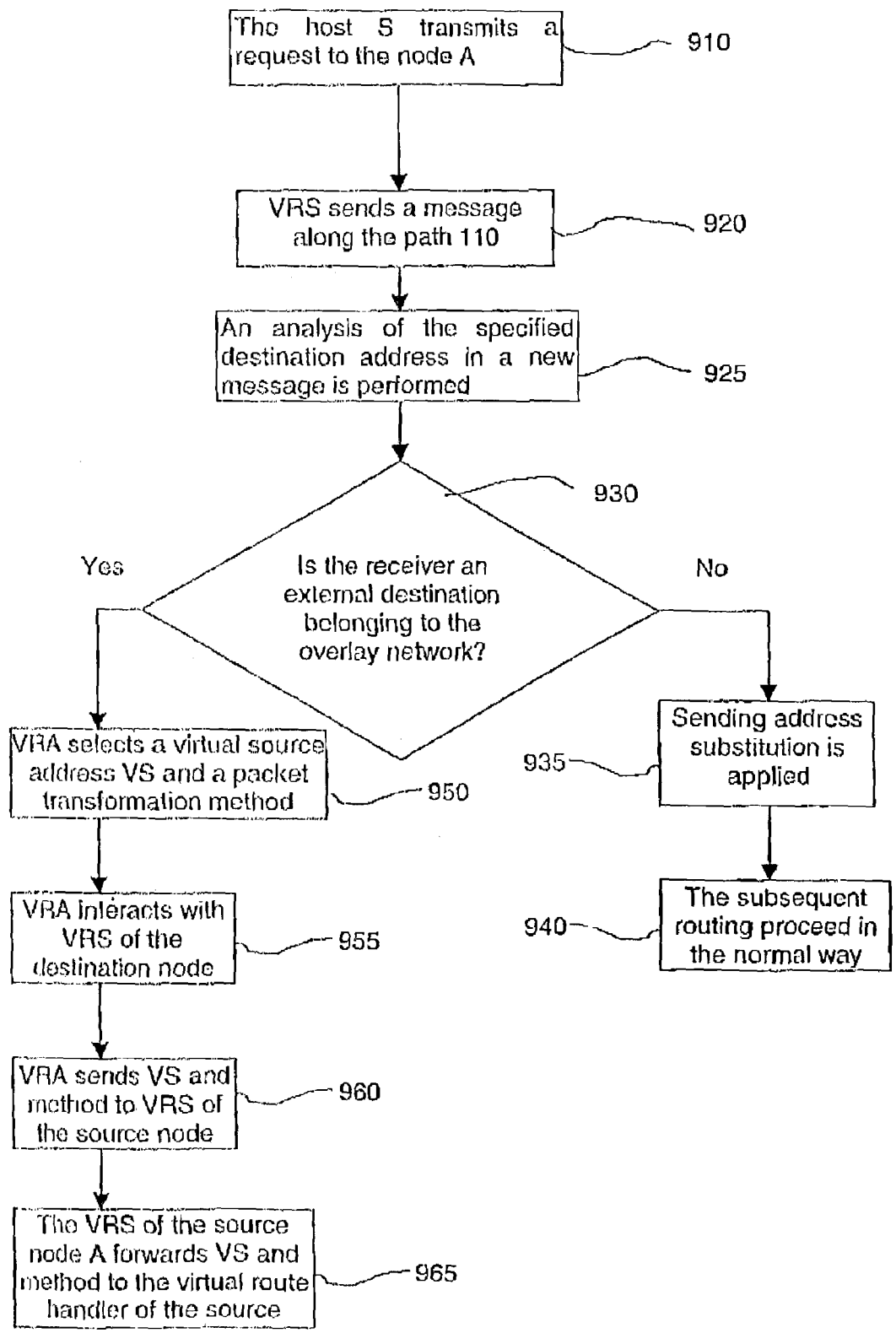
FIG. 6 is a flowchart of another preferred method according to the invention.

Now, a preferred embodiment of the method according to the invention will be disclosed with reference to FIG. 1 and the flowchart in FIG. 6. A VRS is located in each of the nodes A and B, whereby the sending and the receiving networks 101 and 102, respectively, have similar nodal structures. In addition to the previously described VRS-functions at incoming communication, the VRS performs functions as described below for outgoing communication. The communication between the VRA and the sending host S is now split into two steps whereby the VRS in the node A acts as an intermediary node. The procedure is illustrated in FIG. 6. In a first step, see block 910, the sending host S transmits a request for a virtual address VS to the VRS located in the node A. The format of this request corresponds to FIG. 3a where receiver address 202 is replaced by the address of VRS in the node A. In a second step, see block 920, the VRS creates a message comprising an encrypted data section sent along the path 110. The format corresponds to FIG. 3a, however the sending address 201 has been replaced by the address of the VRS. Thus, the VRS acts as a proxy towards the exterior Internet. Similarly, the communication between the VRA and the other VRS, e.g. the VRS located in the node B, is also encrypted. Whereas the VRA and the VRS nodes comprise a separate network for routing management, such encryption can be planned at implementation of these nodes. In comparison with the total network of connected hosts, the routing management network will be much easier to handle. Because of the VRS, no internal node in an independent network, e.g. the independent network 101, will expose its network address to the global Internet.

So far, the invention has been disclosed as applied to communication between hosts when the communicating parties belong to the same overlay network. The overlay network is operated by one organization, and it comprises geographically distributed networks that are interconnected over external networks being provided by other organizations.

In block 925, the specified destination address in a new message is analyzed. The VRA server uses the result from said analysis. In block 930, the VRA finds that the receiver is an external destination not belonging to the overlay network. External addresses are recognized by not belonging to addresses allocated for local use. At the Internet, specific address ranges are allocated for private use inside private networks. In this case, the VRA uses the aforementioned Network Address Translation method. The VRA then puts itself as the virtual sender and thus becomes the receiver of return messages and executes then firewall functions. In another embodiment, the VRA uses another address to allocate another firewall. The VRA selects that firewall from a pool of firewall hosts. In such a case, the VRA must communicate with said other firewall to set up the proper relation between the assigned global address and the original sending host address. The firewall knowing the internal address of the original source host, forwards return packets to that destination. The firewall and the VRS of the destination belong to the routing management network. When the destination does not belong to the overlay network, the flow proceeds to block 935 and only sending address substitution may be applied, no other packet transformation can be used. Finally, in block 940, the subsequent routing proceed in the normal way.

In FIG. 6, when the receiving node belongs to the overlay network, the flow goes from block 930 to block 950. In block 950, the VRA selects a virtual source address VS and a packet transformation method. Thereafter, in block 955, the VRA interacts with the VRS of the destination node. Then, in block 960, the VRA sends information concerning VS and selected method to the VRS of the source node. Finally, in block 965, the VRS of the source node forwards information concerning VS and method to the virtual route handler VHR of the source node.

A further embodiment of the invention may be used, when hosts belonging to the overlay network communicate with hosts belonging to external networks. Within the overlay network, all hosts, routers etc. being affected, are able to provide what is required from them in order to fulfill the disclosed method. This ability cannot be required from external networks and hosts. They only forward what they see as connection packets. Thus, the method according to the invention does not require that external networks and hosts can use said method. For outbound communication from hosts belonging to the overlay network to hosts belonging to external networks EXT1, EXT2, (see FIG. 1) egress proxies are now introduced to act as outgoing gateways (break out points). Likewise, ingress proxies are now introduced as incoming gateways (break in points). Egress and ingress proxies acts towards the VRA like destinations and sources, respectively, of the overlay network. Thus, the VRA, using already disclosed methods, can administrate paths inside the overlay network that leave the overlay network at egress proxies and enter the overlay network at ingress proxies. There may be many incoming and outgoing gateways at different locations. The VRA can select the most appropriate to be used, e.g. depending on the original source and the final destination. The VRA may also take into consideration where caching services and firewall services are available for outgoing and incoming traffic, respectively. The VRA then manages the selection of paths between hosts and egress and ingress proxies. For outgoing requests, the VRA provides the egress proxy with a virtual source address belonging to the ingress proxy that has been selected for responses. The VRA then informs the ingress proxy of the real destination corresponding to the virtual source address. Thus, the ingress proxy can forward responses provided with virtual source addresses as their dummy destination to their real destinations. In FIG. 1, when host S of network 101 communicates with a host in the external network 131, an ingress proxy may be located in the node A, an egress proxy may be located in the node B, the nodes A and B belonging to the same organization. The destination may be located in the independent network 131. Outgoing traffic from the host S then exits the overlay network at the node B and the related return traffic enters the overlay network at the node A.

Figure 4:
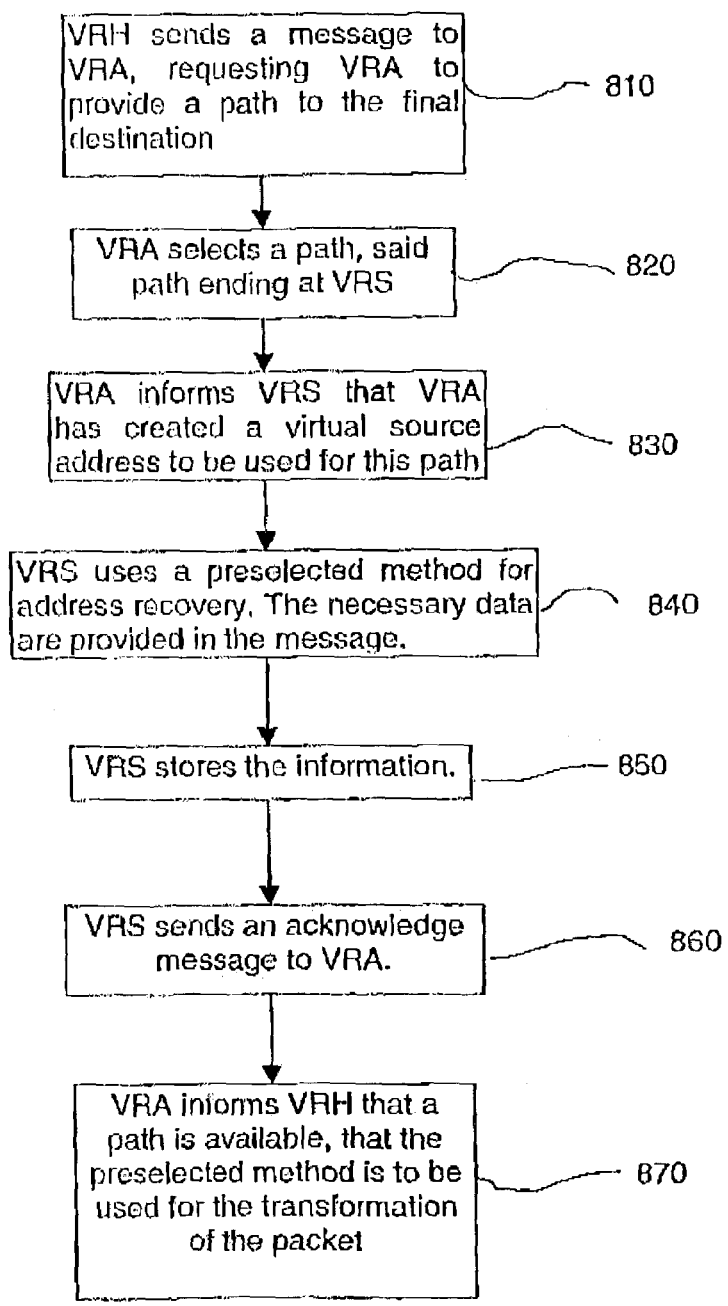
FIG. 4 is a flowchart of a preferred method according to the invention.

The inventive method will now be disclosed with reference to FIGS. 1 and 4. In block 810, the Virtual Route Handler VRH sends a message to the Virtual Route Administrator VRA, requesting the VRA to provide a path to the final destination, e.g. the receiving host D, for the sending host S. Thereafter, in block 820, the VRA selects a path, the path ending at the Virtual Route Server VRS, serving the receiving host D. In block 830, the VRA sends a message to the VRS, the message informing the VRS that the VRA has created a virtual source address to be used for the selected path. Then, in block 840, the VRS stores information about a selected method for packet transformation. The data being necessary for restoration of packets is enclosed in the message received from the VRA. If a pure virtual source address is used the associated original source and destination addresses are provided. If the virtual source and index method is used, the original addresses associated with the index are provided. Furthermore, if the method of source routing that is used has changed, the original information packets required to extract the original information are provided. In block 850, the VRS stores the information in a database located in or connected to the VRS. Thereafter, in block 860, the VRS sends a message to the VRA, acknowledging that the VRS has stored information concerning the recovery of addresses. Finally, in block 870, the VRA informs the VRH that said selected method and data is to be used for the transformation of the packet. The payload packets are then traveling from the sending host S through the nodes a1, A, Z, B, b3 and b4 in the Internet before reaching the receiving host D.

In a further embodiment of the invention, the path received from the VRA is a loose source routing path, i.e. a set of predetermined routers are passed on the route from sending host to receiving host, but multiple hops are allowed in between two of said routers. Multiple hops are in this disclosure defined as hops over several intermediary routers.

In a yet further embodiment, the VRA determines at least one virtual connection comprising a set of predetermined routers. A man skilled in the art understands that the path may comprise switching along connection oriented sections, e.g. based on the method of TAG-switching known by a man skilled in the art of Internet. These at least one virtual connections can then be inserted as component paths in the complete path from sending host to receiving host. The selection of such a component path can e.g. be controlled by a tag, attached to a package, according to e.g. RFC2105 submitted to the Internet Engineering Task Force, IETF. (The Internet Request for Comments, called RFC, documents are the written definitions of the protocols and policies of the Internet). All packets having the same tag are then forwarded on the same path to a destination within a network of interconnected tag switches.

It readily follows from the above disclosure, that the controlled routing method according to the method disclosed herein results in a secure transmission as neither the original sender address nor the final destination address may be traced by external parties from information located in the transmitted datagram.

Another advantage of the method disclosed herein is that a return message from the host D, if applying the same method as described above for the forward message, includes no information enabling an external party to relate the forward message and the return message to each other. Thus, the possibilities of decoding encrypted messages and other fraudulent attacks are decreased.

The method disclosed herein can be implemented to create a company overlay network on top of a public Internet. The overlay network may be established for internal use or by an Internet Service Provider (ISP) to offer a global network service via geographically distributed local access networks.

The invention claimed is:

1. A communication method in an IP based overlay network comprising a number of first sub-networks which all are provided by a first organization and a plurality of external networks which are provided by organizations other than the first organization, wherein a sending host located in one of the first sub-networks wants to communicate with a receiving host that is located in another one of the first sub-networks, which is a destination sub-network, the communication method comprising:

the sending host sending a message via the overlay network to the receiving host in an IP datagram that travels along a route comprising selected ones of said external networks to which the first organization has additional nodes connected, wherein the overlay network is under full control of the first organization;

the sending host, as sender of the IP datagram, indicating a first address administered by and belonging to a route administering node and a second address belonging to a route server, acting as receiver of the IP datagram, in the destination sub-network;

said route server replacing the first and second addresses in the IP datagram with local addresses of the sender and the receiver respectively and forwarding the IP datagram to the local address of the receiving host;

the route administering node selecting nodes in a path that the IP datagram must follow from the sending host to the route server in the destination network;

assigning the first address, administered by the route administering node, to the selected route; and communicating the assigned first address to the sending host and to the route server, said first address having a relation to the selected route.

2. The communication method in accordance with claim 1, wherein the route administering node further communicates to the sending host and to the route server in the destination network a method to enforce routing the IP datagram via the selected path, the sending host in response thereto transforming the IP datagram in accordance with a selected transformation method; and upon reception of the transformed IP datagram, the route server in the destination sub-network, restoring the IP datagram into its original form.

3. The communication method in accordance with claim 2, further comprising the route administering node signaling to the route server in the receiving sub-network said first address, said first address being a global address belonging to the route administering node, and its relation to the route between the sending and receiving hosts wherein the route server stores said first global address in a record.

4. The communication method in accordance with claim 3 wherein the route server upon receipt of the IP datagram interrogates its stored records with regard to the received first global address and performs said replacement of the first and second addresses with the local addresses of the sending host and the receiving host.

5. The communication method in accordance with claim 4 wherein the sending host, when desiring to communicate with the receiving host sends its request in the IP datagram to the route administering node, said IP datagram containing in its data part the local addresses of the sending and receiving hosts respectively.

6. The communication method in accordance with claim 3 wherein said additional nodes, said route administering node and a respective node in each one of said first sub-networks together form an overlay network, said selected route comprising a path that leaves the overlay network at one egress server and returns to the overlay network at an ingress server, wherein the route administering node provides the egress server with a virtual address belonging to the ingress server that has been selected for response and informs the ingress server of the real destination corresponding to the virtual address, thus allowing the ingress server to forward responses, that have a source address as a dummy destination, to a final destination.

7. The communication method in accordance with claim 1 wherein the first address is allocated for a predetermined time.

8. The communication method in accordance with claim 7 wherein the first address is complemented with an index so as to separate different communications along the same selected route from each other.

9. The communication method in accordance with claim 7 wherein the first sub-networks are access networks of an Internet service provider.

10. The communication method in accordance with claim 7 wherein the sending host, when desiring to communicate with the receiving host sends its IP datagram to a server in said one of the first sub-networks, said server in one of the first sub-networks acting as an intermediary node for the sending host so as to split up the communication between the sending host and the route administering node in order to hide the sending node.

11. The communication method in accordance with claim 10 wherein the sending host communicates with said server, said server in one of the first sub-networks in its turn transmitting the IP datagram indicating as sending address its own address in said one of the first sub-networks.

* * * * *